US010347130B2

(12) United States Patent
Cho et al.

(10) Patent No.: US 10,347,130 B2
(45) Date of Patent: Jul. 9, 2019

(54) VEHICLE AND CONTROL METHOD THEREOF

(71) Applicant: LG ELECTRONICS INC., Seoul (KR)

(72) Inventors: Eunhyung Cho, Seoul (KR); Jongho Kim, Seoul (KR); Doyoung Lee, Seoul (KR); Jihwan Kim, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 15/594,326

(22) Filed: May 12, 2017

(65) Prior Publication Data
US 2017/0249842 A1 Aug. 31, 2017

Related U.S. Application Data

(63) Continuation of application No. 14/329,706, filed on Jul. 11, 2014, now Pat. No. 9,679,477.

(30) Foreign Application Priority Data

May 12, 2014 (KR) .......................... 10-2014-0056287

(51) Int. Cl.
*B60R 1/00* (2006.01)
*G06K 9/00* (2006.01)
(Continued)

(52) U.S. Cl.
CPC .............. *G08G 1/163* (2013.01); *B60R 1/00* (2013.01); *G06K 9/00791* (2013.01); *G08G 1/04* (2013.01);
(Continued)

(58) Field of Classification Search
CPC combination set(s) only.
See application file for complete search history.

(56) References Cited

U.S. PATENT DOCUMENTS 6,538,622 B1 * 3/2003 Kojima ............... B60R 16/0231
340/901
8,345,098 B2 * 1/2013 Grigsby ................. G08G 1/161
348/143
(Continued)

*Primary Examiner* — William C Vaughn, Jr.
*Assistant Examiner* — Lindsay J Uhl
(74) *Attorney, Agent, or Firm* — Birch, Stewart, Kolasch & Birch, LLP

(57) ABSTRACT

A vehicle configured to share a captured image with another vehicle, the vehicle including a first camera configured to capture the image; a first display; a second display; a speed sensor configured to sense a speed of the vehicle; a distance sensor configured to sense a vehicle-to-vehicle distance between the vehicle and a first vehicle immediately ahead of the vehicle; a transceiver configured to implement data communication between the vehicle and the first vehicle; and a processor configured to control the first camera, the first display, the distance sensor, the speed sensor and the transceiver. The processor is further configured to determine a state of the vehicle based on the speed of the vehicle and the vehicle-to-vehicle distance, display a first image captured by the first camera on the first display when the vehicle is in a first state, wherein the first state is a state in which the speed of the vehicle is equal to or greater than a first speed and less than a second speed, and the vehicle-to-vehicle distance is equal to or greater than a first distance and less than a second distance, display a second image captured by a second camera on the first display when the vehicle is in a second state, wherein the second state is a state in which the speed of the vehicle is equal to or greater than the second speed, and the vehicle-to-vehicle distance is equal to or greater than the second distance, and display the first image on the first display and the second image on the second display when the vehicle-to-vehicle distance is repeatedly increased and reduced within a predetermined time on the first distance or the second distance. In addition, the second camera is a camera installed in a second vehicle, the second vehicle being any one of one or more vehicles ahead of the vehicle.

10 Claims, 12 Drawing Sheets

(51) Int. Cl.
   *G08G 1/04*   (2006.01)
   *G08G 1/16*   (2006.01)
   *G08G 1/052*  (2006.01)
   *G08G 1/0962* (2006.01)

(52) U.S. Cl.
   CPC ........... *G08G 1/052* (2013.01); *G08G 1/0962* (2013.01); *G08G 1/166* (2013.01); *B60R 2300/302* (2013.01); *B60R 2300/303* (2013.01); *B60R 2300/50* (2013.01)

(56) References Cited

U.S. PATENT DOCUMENTS

| | | |
|---|---|---|
| 8,400,507 B2 | 3/2013 | Grigsby et al. |
| 2003/0039123 A1 | 2/2003 | Crisick |
| 2005/0240342 A1 | 10/2005 | Ishihara et al. |
| 2009/0231431 A1 | 9/2009 | Grigsby et al. |
| 2009/0231433 A1 | 9/2009 | Grigsby et al. |
| 2010/0082179 A1 | 4/2010 | Kronenberg |
| 2011/0128136 A1 | 6/2011 | Katoh et al. |
| 2014/0247160 A1 | 9/2014 | Glascock |
| 2014/0341434 A1* | 11/2014 | Lin ................ G08G 1/166 382/104 |
| 2016/0054735 A1 | 2/2016 | Switkes et al. |

\* cited by examiner

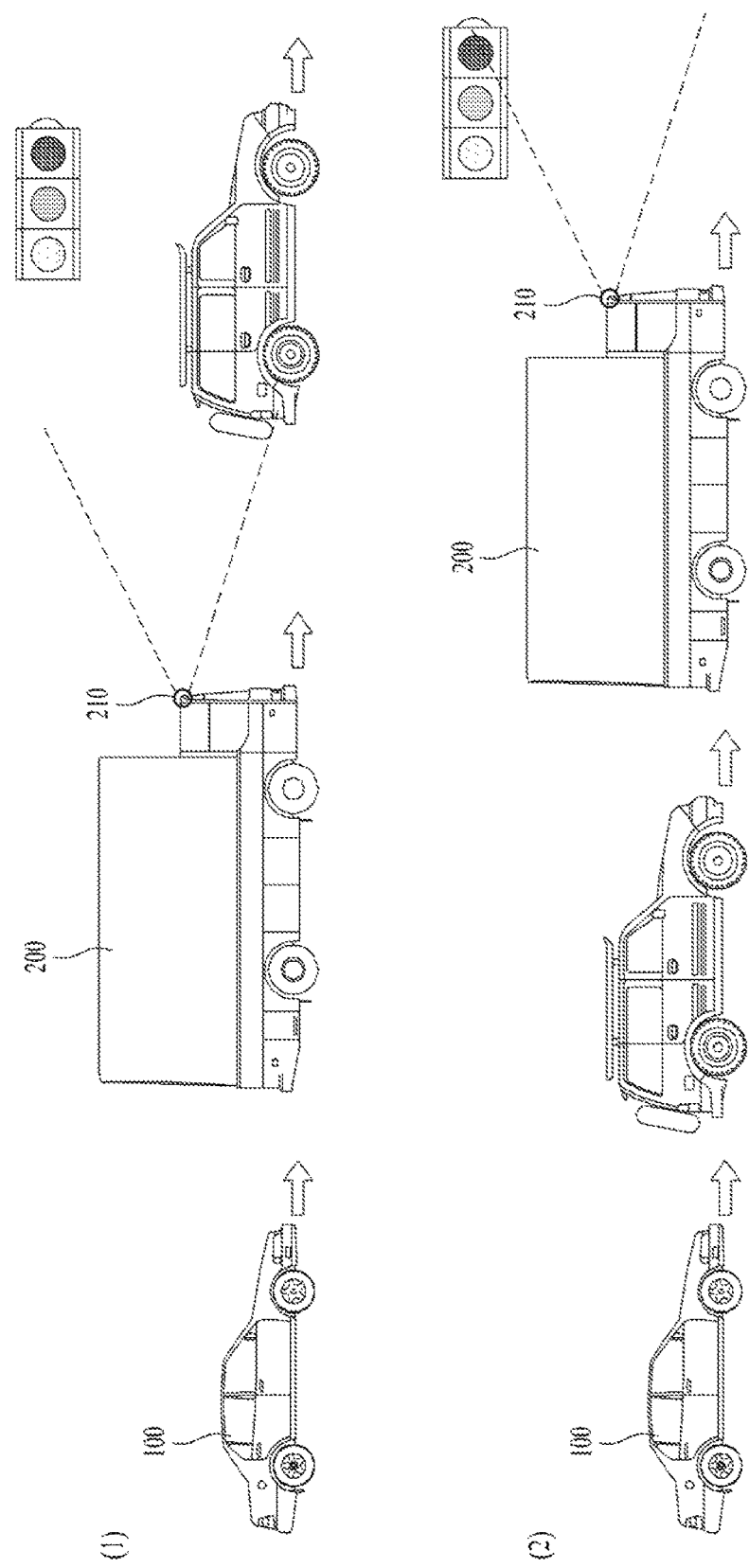

(1)

(2)

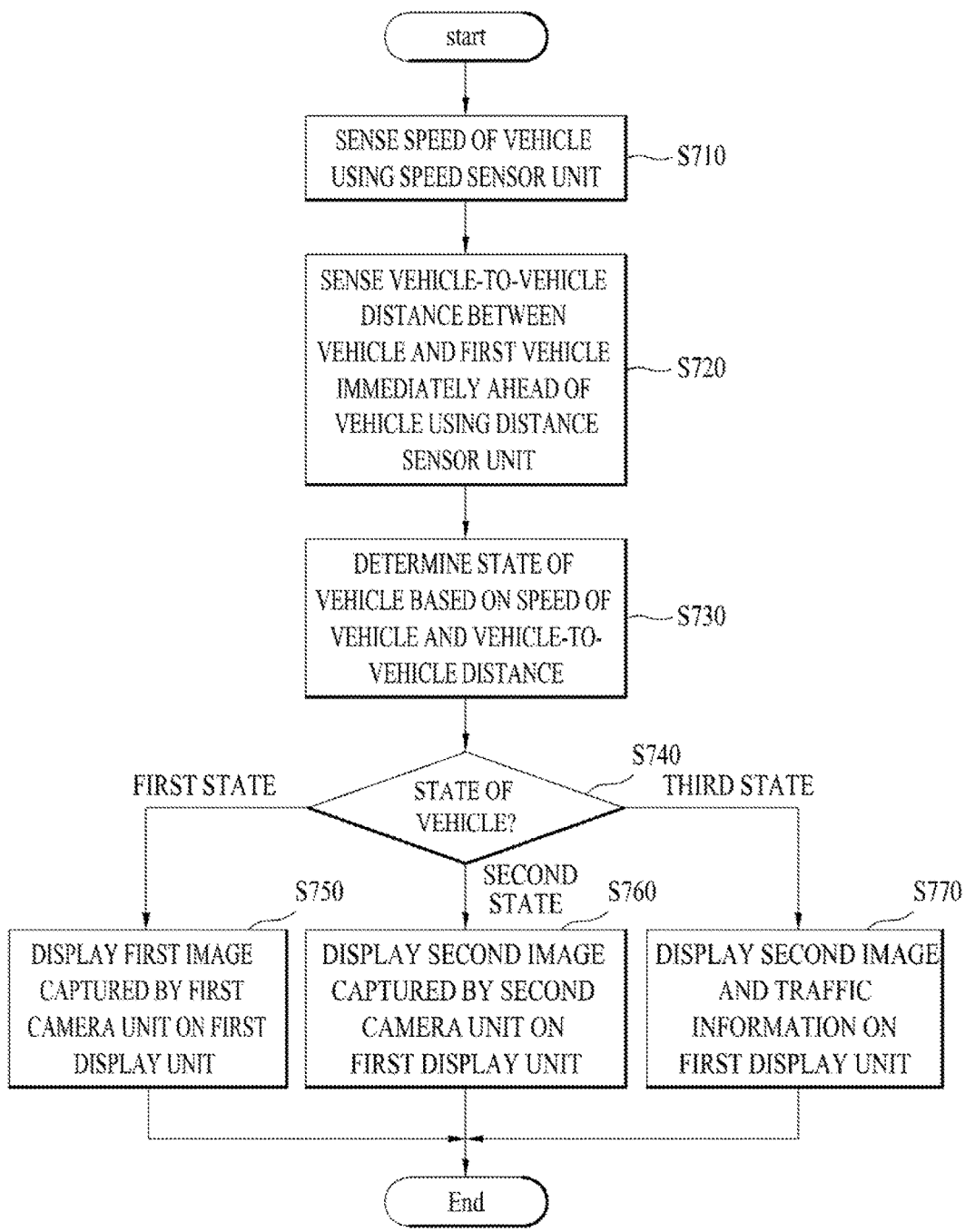

VEHICLE AND CONTROL METHOD THEREOF

This application is a Continuation of co-pending application Ser. No. 14/329,706, filed on Jul. 11, 2014, which claims priority under 35 U.S.C. § 119(a) to Application No. 10-2014-0056287, filed in Republic of Korea on May 12, 2014, all of which are hereby expressly incorporated by reference into the present application.

BACKGROUND OF THE INVENTION

Field of the Invention

The present specification relates to a vehicle, and more particularly to a vehicle having image capture and image display functions and a control method thereof Discussion of the Related Art With recent technical development, a vehicle has been used as a smart device that captures an image in front of the vehicle and displays the captured image and the like.

When the vehicle is used as a device that displays an image in front of the vehicle, i.e. a front image, the vehicle must display an image, i.e. a front image captured by another vehicle, instead of displaying the front image captured by the vehicle itself, based on a speed of the vehicle and a vehicle-to-vehicle distance between the vehicle and the other vehicle.

SUMMARY OF THE INVENTION

Accordingly, the present specification is directed to a vehicle and a control method thereof that substantially obviate one or more problems due to limitations and disadvantages of the related art.

An object of the present specification is to provide a vehicle which displays one of an image in front of the vehicle itself and an image in front of another vehicle in consideration of a speed of the vehicle and a vehicle-to-vehicle distance between the two vehicles and a control method thereof Additional advantages, objects, and features will be set forth in part in the description which follows and in part will become apparent to those having ordinary skill in the art upon examination of the following or may be learned from practice. The objectives and other advantages may be realized and attained by the structure particularly pointed out in the written description and claims hereof as well as the appended drawings.

In accordance with one embodiment of the present specification, a vehicle, configured to share a captured image with another vehicle, includes a first camera unit configured to capture the image, a first display unit configured to display the image, a speed sensor unit configured to sense a speed of the vehicle, a distance sensor unit configured to sense a vehicle-to-vehicle distance between the vehicle and a first vehicle immediately ahead of the vehicle, a communication unit configured to implement data communication between the vehicle and the first vehicle, and a processor configured to control the first camera unit, the first display unit, the distance sensor unit, the speed sensor unit and the communication unit, wherein the processor determines a state of the vehicle based on the speed of the vehicle and the vehicle-to-vehicle distance, wherein the processor displays a first image captured by the first camera unit on the first display unit when the vehicle is in a first state, and the first state is a state in which the speed of the vehicle is equal to or greater than a first speed and less than a second speed and the vehicle-to-vehicle distance is equal to or greater than a first distance and less than a second distance, wherein the processor displays a second image captured by a second camera unit on the first display unit when the vehicle is in a second state, and the second state is a state in which the speed of the vehicle is equal to or greater than the second speed and the vehicle-to-vehicle distance is equal to or greater than the second distance, and wherein the second camera unit is a camera unit installed in a second vehicle, and the second vehicle being any one of one or more vehicles ahead of the vehicle.

In accordance with one embodiment of the present specification, a control method of a vehicle, the vehicle being configured to share a captured image with another vehicle, includes sensing a speed of the vehicle using a speed sensor unit, sensing a vehicle-to-vehicle distance between the vehicle and a first vehicle immediately ahead of the vehicle using a distance sensor unit, determining a state of the vehicle based on the speed of the vehicle and the vehicle-to-vehicle distance, displaying a first image captured by a first camera unit on a first display unit when the vehicle is in a first state, and displaying a second image captured by a second camera unit on the first display unit when the vehicle is in a second state, wherein the first state is a state in which the speed of the vehicle is equal to or greater than a first speed and less than a second speed and the vehicle-to-vehicle distance is equal to or greater than a first distance and less than a second distance, and the second state is a state in which the speed of the vehicle is equal to or greater than the second speed and the vehicle-to-vehicle distance is equal to or greater than the second distance, and wherein the second camera unit is a camera unit installed in a second vehicle, and the second vehicle being any one of one or more vehicles ahead of the vehicle.

It is to be understood that both the foregoing general description and the following detailed description of the present specification are exemplary and explanatory and are intended to provide further explanation of the present specification as claimed.

BRIEF DESCRIPTION OF THE DRAWINGS

The accompanying drawings, which are included to provide a further understanding of the present specification and are incorporated in and constitute a part of this application, illustrate embodiment(s) of the present specification and together with the description serve to explain the principle of the present specification. In the drawings:

FIGS. 4A and 4B show a method of determining a second vehicle and displaying an image captured by the second vehicle by the vehicle according to one embodiment of the present specification;

FIG. 7 is a flowchart of a control method of a vehicle according to one embodiment of the present specification.

DETAILED DESCRIPTION OF THE INVENTION

Hereinafter, the embodiments will be described in detail with reference to the accompanying drawings and content described in the accompanying drawings, but the scope of the claims is not limited or restricted by the embodiments.

Although the terms used in the present specification are selected, as much as possible, from general terms that are widely used at present while taking into consideration the functions, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the present specification. Accordingly, it should be noted that the terms used herein should be construed based on practical meanings thereof and the whole content of this specification, rather than being simply construed based on names of the terms.

In the present specification, vehicles may mean various kinds of transportation means equipped with camera units and display units. For example, vehicles may include automobiles, trains, airplanes, helicopters and the like equipped with camera units and display units.

In addition, in the present specification, a vehicle refers to a user vehicle and a first vehicle and a second vehicle refer to vehicles rather than the user vehicle.

Figure 1A:
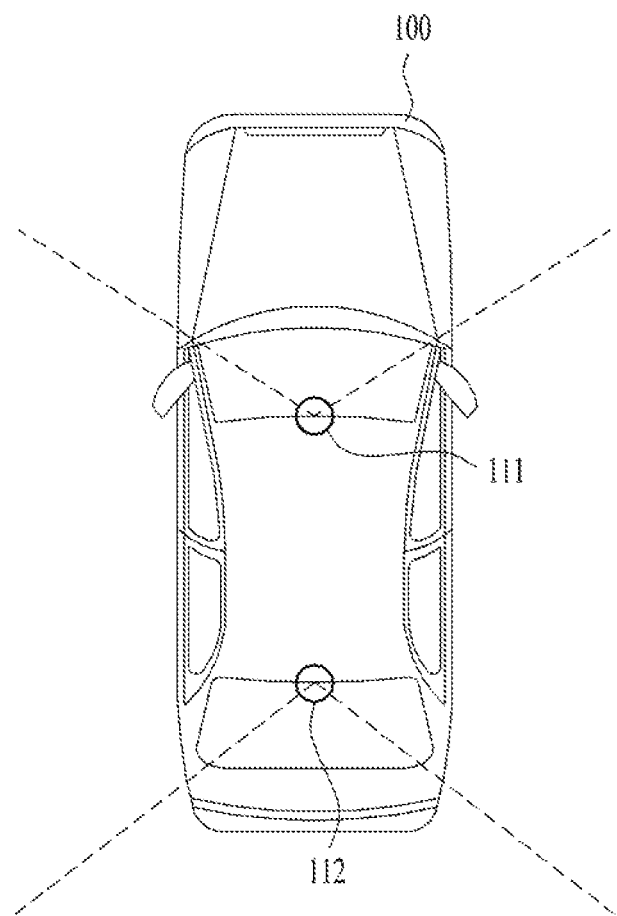
FIGS. 1A and 1B show a method of capturing images and displaying the captured images by a vehicle according to one embodiment of the present specification.
Figure 1B:
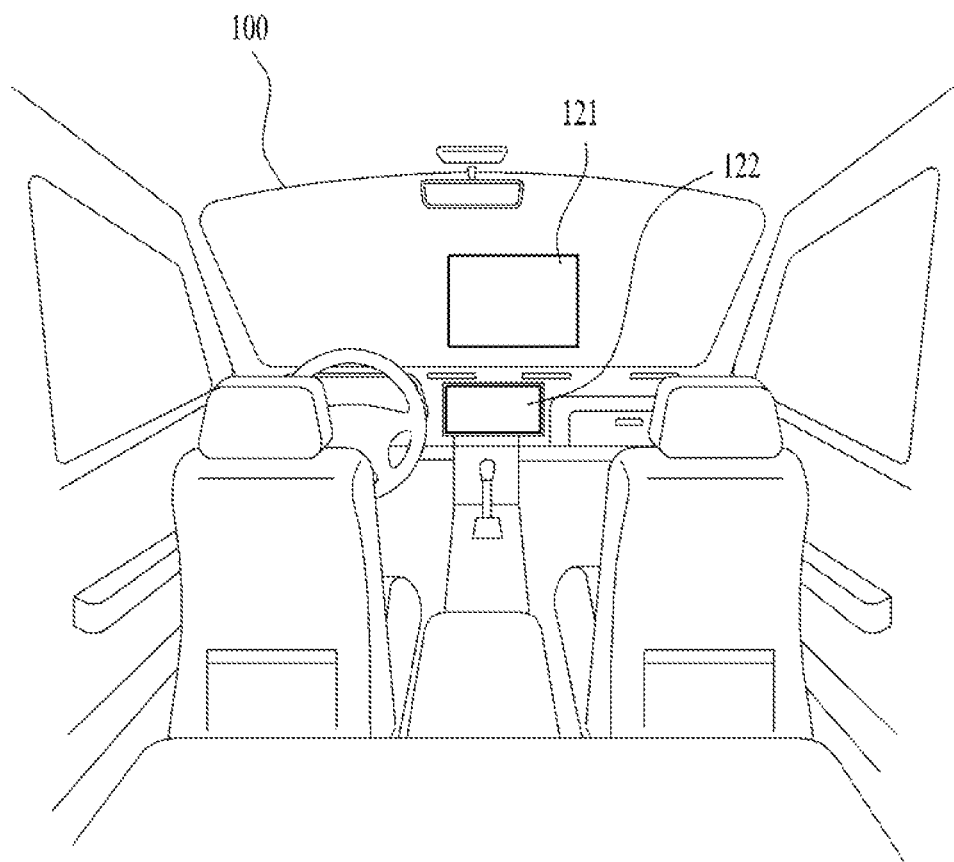

FIGS. 1A and 1B show a method of capturing images and displaying the captured images by a vehicle according to one embodiment of the present specification. More specifically, FIG. 1A shows a method of capturing images via camera units by the vehicle and FIG. 1B shows a method of displaying images on display units by the vehicle.

Referring to FIG. 1A, the vehicle 100 may include at least one camera unit. In this case, the vehicle 100 may include at least one camera unit to capture images around the vehicle 100. For example, the vehicle 100 may include a front camera unit 111 installed at the front side of the vehicle 100. In addition, the vehicle 100 may further include a rear camera unit 112 installed at the rear side of the vehicle 100.

In this case, each camera unit may capture plural images within a view angle range thereof. For example, the front camera unit 111 may capture plural images in front of the vehicle 100 within a view angle range thereof and the rear camera unit 112 may capture plural images at the rear of the vehicle 100 within a view angle range thereof.

Referring to FIG. 1B, the vehicle 100 may include at least one display unit. For example, the vehicle 100 may include a first display unit 121 installed to an inner surface of a front window of the vehicle 100. For example, the first display unit 121 may be a transparent display unit provided at an inner surface of the front window of the vehicle 100. In addition, the vehicle 100 may include a second display unit 122 installed in a front interior region of the vehicle 100. In one example, the second display unit 122 may be a display unit included in a navigation device of the vehicle 100. In another example, the second display unit 122 may be an auxiliary display unit of the first display unit 121 provided inside the front window.

In this case, each display unit may display plural images captured by the camera unit. For example, the first display unit 121 may display plural images captured by the front camera unit 111 in a video format. In addition, the second display unit 122 may display plural images captured by the rear camera unit 112.

Figure 2:
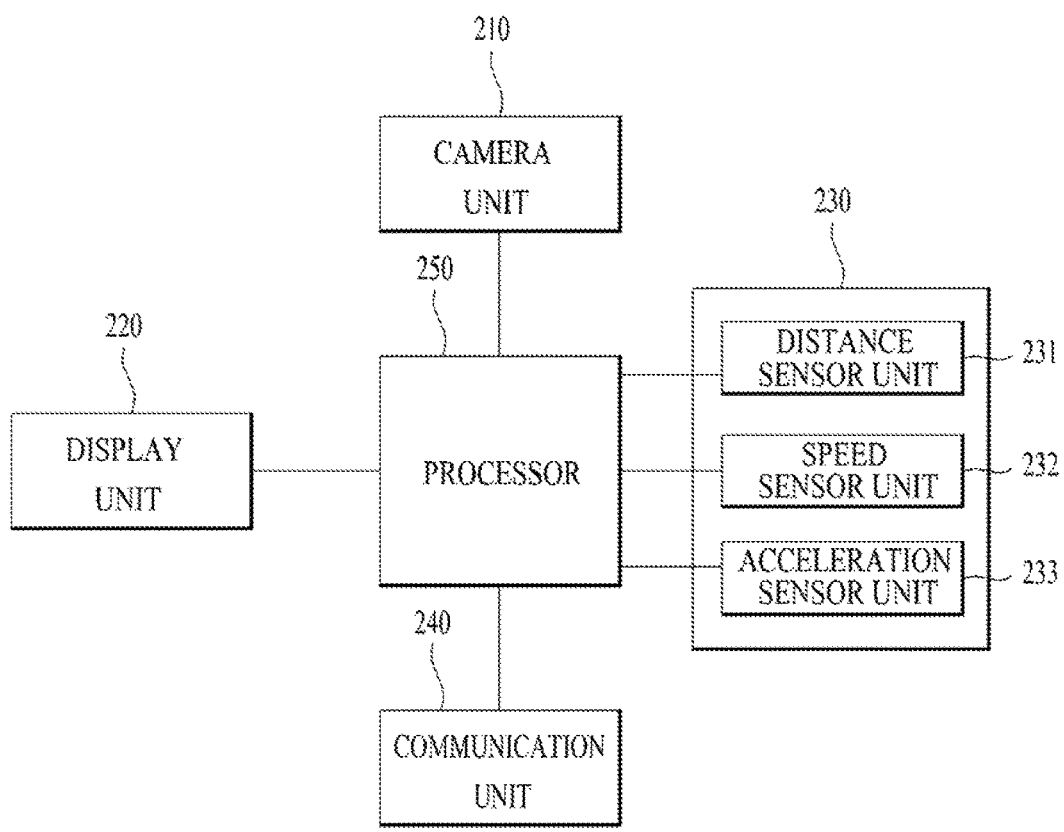
FIG. 2 is a view showing a configuration of a vehicle according to one embodiment of the present specification.

FIG. 2 is a view showing a configuration of a vehicle according to one embodiment of the present specification.

Referring to FIG. 2, the vehicle may include at least one camera unit 210, at least one display unit 220, at least one sensor unit 230, a communication unit 240 and a processor 250. In addition, the vehicle may include various other components required for driving of the vehicle.

The camera unit 210 may capture images around the vehicle. For example, the camera unit 210 may be a front camera unit that is installed at the front side of a user vehicle to capture images in front of the user vehicle. In addition, the camera unit 210 may be a rear camera unit that is installed at the rear side of the user vehicle to capture images at the rear of the user vehicle.

The display unit 220 may display images. In one example, the display unit 220 may be a first display unit that is installed to an inner surface of a front window of the user vehicle to display images. In this case, the first display unit may display an image captured by the user vehicle or an image captured by another vehicle rather than the user vehicle. In another example, the display unit 220 may be a second display unit that is installed in a front interior region of the user vehicle. In this case, the second display unit may display images at the rear of the user vehicle captured by the rear camera unit of the user vehicle.

According to embodiments, the display unit 220 may include at least one of Light Emitting Diode (LED), Organic Light Emitting Diode (OLED), Liquid Crystal Display (LCD), electronic ink and flexible display devices. In addition, the display unit 220 may include a touch sensitive display unit and detect user input of touching the display unit 220.

The sensor unit 230 may sense at least one of surrounding environment of the vehicle and user input. The sensor unit 230 may sense at least one of surrounding environment of the vehicle and user input using at least one sensing means included in the vehicle and transmit the sensed result to the processor 250. The at least one sensing means may include a gravity sensor, a motion sensor, a gyroscopic sensor, an accelerometer, an infrared sensor, an inclination sensor, a bending sensor, an audio sensor, a video sensor, an image sensor, a Global Positioning System (GPS) sensor, a touch sensor and the like. The aforementioned sensors may be included as separate elements in the vehicle, or may be integrated into at least one element and included in the vehicle.

In the present specification, the sensor unit 230 may include a distance sensor unit 231, a speed sensor unit 232 and an acceleration sensor unit 233.

The distance sensor unit 231 may sense a vehicle-to-vehicle distance between the user vehicle and a first vehicle directly ahead of the user vehicle. Here, the first vehicle may refer to a vehicle having the shortest distance from the user vehicle among vehicles in front of the user vehicle. In this case, the first vehicle may be a vehicle located in the same lane as the user vehicle, without being limited thereto. In addition, the first vehicle may be a vehicle travelling in the same direction as the user vehicle.

The speed sensor unit 232 may sense a speed of the user vehicle. The acceleration sensor unit 233 may sense acceleration of the user vehicle. The acceleration sensor unit 233 is optional.

The communication unit 240 may implement data communication between vehicles. The communication unit 240 may implement data communication between the user vehicle and the other vehicle. For example, the communication unit 240 may transmit image data related to an image captured by the user vehicle to the other vehicle and receive image data related to an image captured by the other vehicle.

The communication unit 240 may implement data communication with the other vehicle that satisfies a predetermined condition. For example, the communication unit 240 may implement data communication with the other vehicle that is present within a predetermined distance of the user vehicle.

In addition, the communication unit 240 may implement data communication with a nearby base station. For example, the communication unit 240 may receive traffic information from the nearby base station.

The processor 250 may control at least one unit included in the vehicle. More specifically, the processor 250 may control the aforementioned respective units and control transmission and/or reception of data between the respective units.

In the present specification, the processor 250 may determine the state of the user vehicle based on a speed of the user vehicle and a vehicle-to-vehicle distance between the user vehicle and the first vehicle. Here, the state of the vehicle may include a first state, a second state and a third state.

In this case, the first state may refer to a state in which a speed of the vehicle is equal to or greater than a first speed and less than a second speed and a vehicle-to-vehicle distance is equal to or greater than a first distance and less than a second distance. In addition, the second state may refer to a state in which a speed of the vehicle is equal to or greater than the second speed and a vehicle-to-vehicle distance is equal to or greater than the second distance. In addition, the third state may refer to a state in which a speed of the vehicle is less than the first speed and a vehicle-to-vehicle distance is less than the first distance.

When the vehicle is in the first state, the processor 250 may display a first image captured by a first camera unit on a first display unit. Here, the first camera unit and the first display unit may respectively be a camera unit and a display unit which are installed to the user vehicle. Here, the first image may be an image group including plural images captured by the first camera unit.

When the vehicle is in the second state, the processor 250 may display a second image captured by a second camera unit on the first display unit. Here, the second camera unit may be a camera unit installed in a second vehicle rather than the user vehicle. Here, the second image may be an image group including plural images captured by the second camera unit.

In this case, the second vehicle may be any one of one or more vehicles ahead of the user vehicle. In one example, the second vehicle and the first vehicle may be one and the same. In another example, the second vehicle may be a vehicle, a front visual field of which is secured, among one or more vehicles ahead of the first vehicle. That is, the second vehicle may be a vehicle, a front visual field of which is secured and a distance from the user vehicle of which has the shortest value, among one or more vehicles ahead of the first vehicle. In this case, the second vehicle may be a vehicle in the same lane as the user vehicle, without being limited thereto. In addition, the second vehicle may be a vehicle traveling in the same direction as the user vehicle and the first vehicle.

When the vehicle is in the third state, the processor 250 may display the second image on the first display unit. In addition, when the vehicle is in the third state, the processor 250 may display traffic information and the second image on a first display area. Here, the traffic information may include at least one of traffic signal information, traffic situation information on a per road section basis and traffic accident information.

The above operations of the processor 250 will be described below in detail with reference to the respective drawings. In the following description, the processor 250 may be described as controlling the vehicle or at least one unit included in the vehicle, and the processor 250 and the vehicle may be regarded in the same light.

Figure 3A:
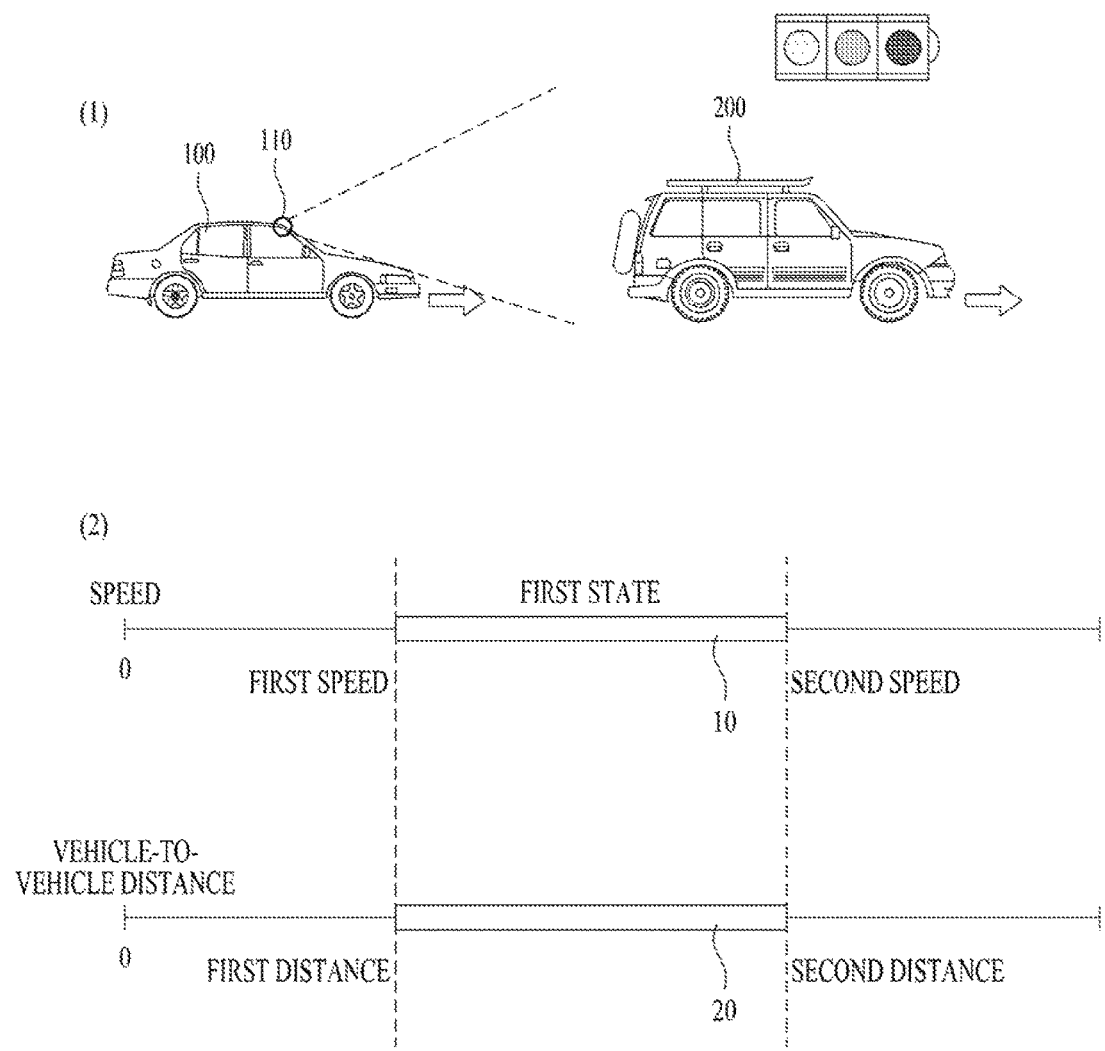
FIGS. 3A, 3B, and 3C show the state of a vehicle according to one embodiment of the present specification.
Figure 3B:
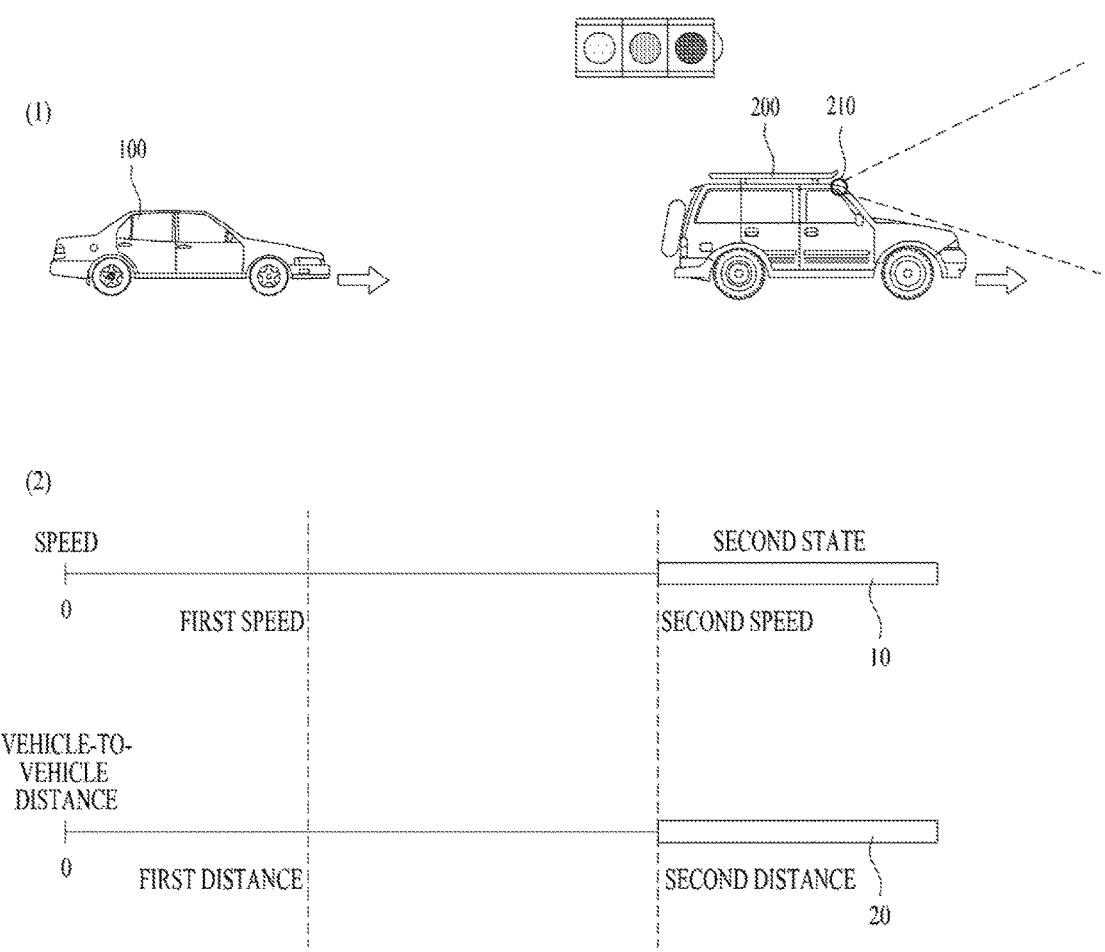
Figure 3C:
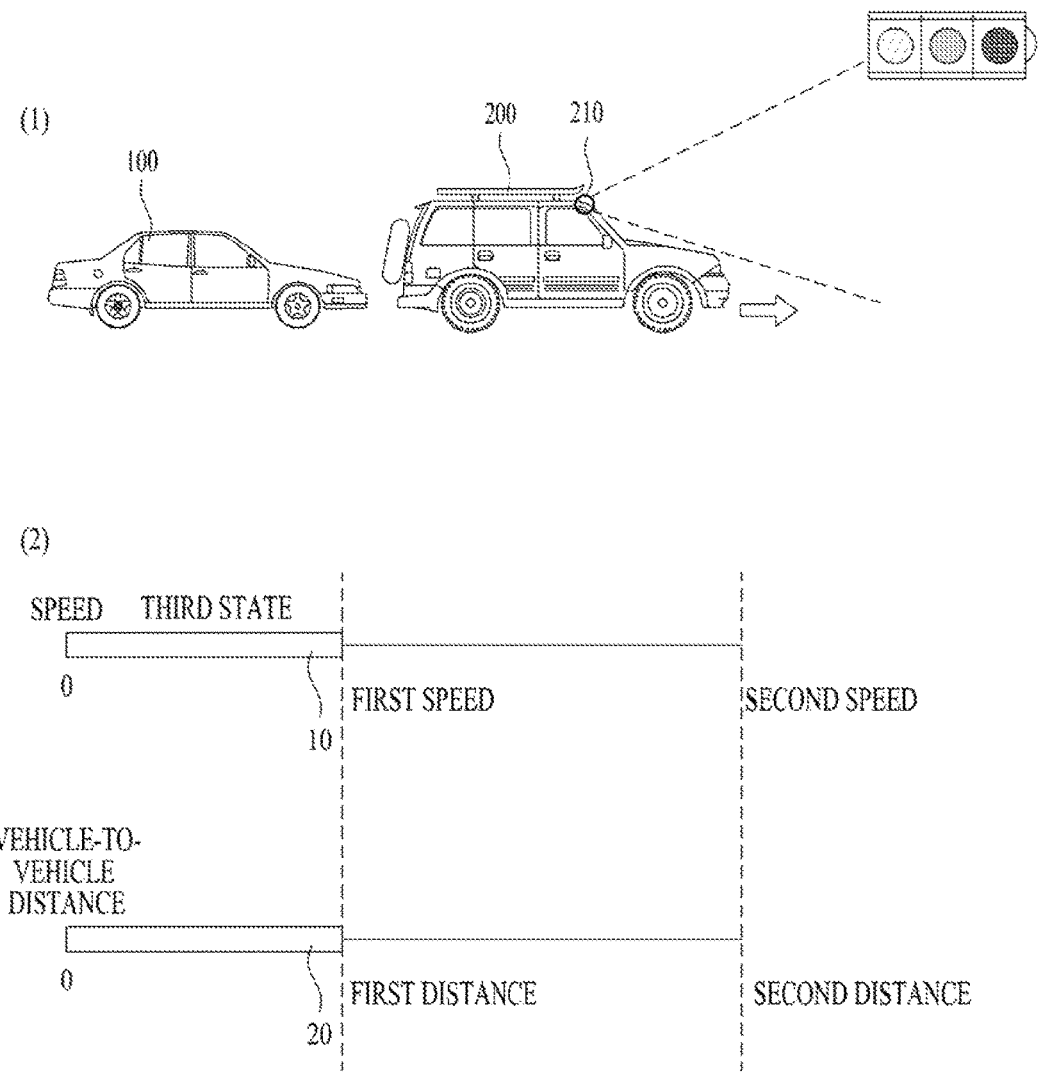

FIGS. 3A, 3B, and 3C show the state of a vehicle according to one embodiment of the present specification. More specifically, FIG. 3A shows the first state of the vehicle, FIG. 3B shows the second state of the vehicle and FIG. 3C shows the third state of the vehicle.

Referring to FIG. 3A, the vehicle 100 may be in the first state. Here, the first state may refer to a state in which a speed 10 of the user vehicle 100 is equal to or greater than a first speed and less than a second speed and a vehicle-to-vehicle distance 20 between the user vehicle 100 and a first vehicle 200 is equal to or greater than a first distance and less than a second distance.

In this case, the first speed may refer to a speed at which the vehicle may be judged as being in a stationary state. That is, when the speed 10 of the vehicle is less than the first speed, the processor may judge that the vehicle is in a stationary state. In this case, the second speed may refer to a speed at which the vehicle may be judged in a general driving state. That is, when the speed 10 of the vehicle is equal to the second speed, the processor may judge that the vehicle is in a general driving state. In addition, when the speed 10 of the vehicle is equal to or greater than the first speed and less than the second speed, the processor may judge that the vehicle is in a transition state from the general driving state to the stationary state or from the stationary state to the general driving state.

In this case, the first distance may refer to a distance at which the vehicle may be judged as being within a danger distance. That is, when the vehicle-to-vehicle distance 20 is less than the first distance, the processor may judge that the user vehicle and the first vehicle maintain a danger distance there between. In this case, the second distance may refer to a distance at which the vehicle may be judged as being within a safe distance. That is, when the vehicle-to-vehicle distance 20 is equal to or greater than the second distance, the processor may judge that the user vehicle and the first vehicle maintain a safe distance there between. In addition, when the vehicle-to-vehicle distance 20 is equal to or greater than the first distance and less than the second distance, the processor may judge that the distance between the user vehicle and the first vehicle is a transition distance from the danger distance to the safe distance or from the safe distance to the danger distance.

When the vehicle 100 is in the first state, the vehicle 100 may display a first image captured by a first camera unit 110 on a first display unit. In this case, the first camera unit 110, as exemplarily shown in FIG. 3A, may be a front camera unit of the user vehicle 100 which capture an image in front of the user vehicle 100. That is, when the speed 10 of the vehicle is a speed between the general driving state and the stationary state and the vehicle-to-vehicle distance 20 is a distance between the safe distance and the danger distance, the user vehicle 100 may display a front image captured by the user vehicle on the display unit installed to the user vehicle.

In addition, when the vehicle is in the first state, the user vehicle 100 may further display the vehicle-to-vehicle distance 20 between the user vehicle 100 and the first vehicle 200 on the first display unit. In this way, a user may maintain a safe distance with the first vehicle 200.

Referring to FIG. 3B, the vehicle 100 may be in the second state. Here, the second state may refer to a state in which the speed 10 of the user vehicle 100 is equal to or greater than the second speed and the vehicle-to-vehicle distance 20 between the user vehicle 100 and the first vehicle 200 is equal to or greater than the second distance.

When the vehicle 100 is in the second state, the vehicle 100 may display a second image captured by a second camera unit 210 on the first display unit. In this case, the second camera unit 210 may be a front camera unit which captures an image in front of a second vehicle 200 rather than the user vehicle 100. Here, as exemplarily shown in FIG. 3B, the second vehicle 200 and the first vehicle may be one and the same. That is, when the speed 10 of the user vehicle 100 is a speed of the general driving state and the vehicle-to-vehicle distance 20 is the safe distance, the user vehicle 100 may display a front image captured by the other vehicle 200 rather than the user vehicle 100 on the display unit installed to the user vehicle 100.

In addition, the vehicle 100 may further include an acceleration sensor unit to sense acceleration of the vehicle. When acceleration of the vehicle 100 is sensed as a negative acceleration that is equal to or greater than a threshold in the second state of the vehicle, the vehicle 100 may switch from the second image to the first image and display the first image.

When the vehicle-to-vehicle distance 20 is equal to or greater than a third distance, the vehicle 100 may deactivate the first display unit. Here, the third distance may be longer than the second distance. That is, when the vehicle-to-vehicle distance is too long, the vehicle may stop image display.

Referring to FIG. 3C, the vehicle 100 may be in a third state. Here, the third state may refer to a state in which in which the speed 10 of the user vehicle 100 is less than the first speed and the vehicle-to-vehicle distance 20 between the user vehicle 100 and the first vehicle 200 is less than the first distance.

When the vehicle 100 is in the third state, the vehicle 100 may display the second image captured by the second camera unit 210 on the first display unit. In this case, the second camera unit 210 may be a front camera unit which captures an image in front of the second vehicle 200 rather than the user vehicle 100. Here, as exemplarily shown in FIG. 3C, the second vehicle 200 and the first vehicle may be one and the same. That is, when the speed 10 of the vehicle 100 is a speed of the stationary state and the vehicle-to-vehicle distance 20 is the danger distance, the user vehicle 100 may display a front image captured by the other vehicle 200 rather than the user vehicle on the display unit installed in the user vehicle.

In addition, when the vehicle 100 is in the third state, the vehicle 100 may further display traffic information on the first display unit. Here, the traffic information may include at least one of traffic signal information, traffic situation information on a per road section basis and traffic accident information. That is, when the vehicle is in a stationary state, the user may check traffic information via the display unit installed in the user vehicle.

The vehicle 100 may further include a third camera unit to capture a third image at the rear of the user vehicle 100. When the vehicle 100 is in the third state, the vehicle 100 may further display the third image on the first display unit. That is, when the vehicle is in a stationary state, the user may check an image in front of the user vehicle as well as an image at the rear of the user vehicle.

Although FIGS. 3A, 3B, and 3C illustrate representative three states of the vehicle 100, the vehicle 100 may have an additional state or an unexpected state except for the above three states. This will be described below in detail with reference to FIGS. 5, 6A, and 6B.

Figure 4B:
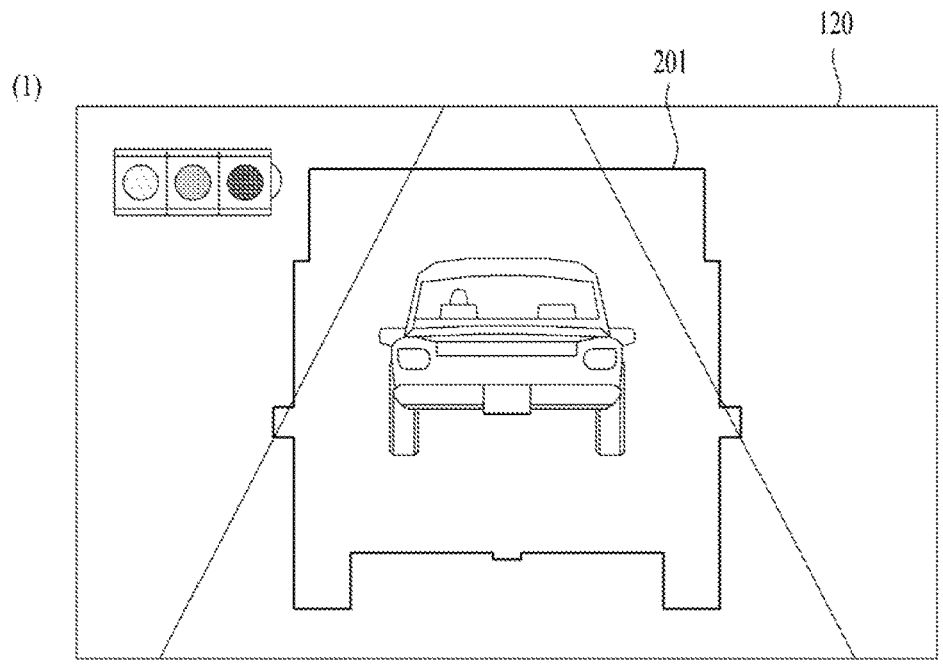
Figure 4B:
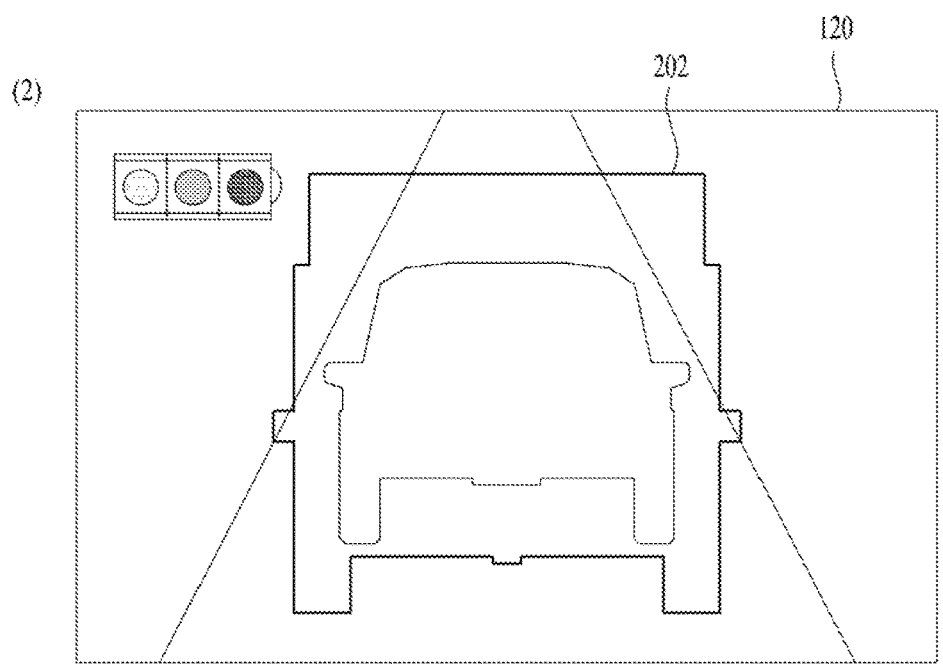

FIGS. 4A and 4B show a method of determining a second vehicle and displaying an image captured by the second vehicle by the vehicle according to one embodiment of the present specification. More specifically, FIG. 4A shows a method of determining a second vehicle according to whether or not a visual field of the vehicle is secured and FIG. 4B shows a method of displaying an image captured by the second vehicle and an image of the second vehicle by the vehicle.

Referring to FIG. 4A, when the user vehicle 100 is in the second state and a plurality of vehicles is located ahead of the user vehicle 100, the vehicle 100 may determine the second vehicle 200 among the plurality of vehicles.

As exemplarily shown in FIG. 4A-(1), when a visual field of the first vehicle located immediately ahead of the user vehicle 100 is secured, the vehicle 100 may determine the first vehicle as the second vehicle 200. In this case, whether or not a visual field of each vehicle is secured may be judged based on a predetermined image analysis method.

Once the second vehicle 200 is determined, the vehicle 100 may receive a second image captured by the second vehicle 200 and display the second image on the first display unit. This will be described below in detail with reference to FIG. 4B-(1).

As exemplarily shown in FIG. 4A-(2), when a visual field of the first vehicle immediately ahead of the user vehicle 100 is not secured, the vehicle 100 may determine whether or not a visual field of a vehicle immediately ahead of the first vehicle is secured. When a visual field of the vehicle immediately ahead of the first vehicle is secured, the vehicle may determine the vehicle immediately ahead of the first vehicle as the second vehicle 200.

Once the second vehicle 200 is determined, the vehicle 100 may receive a second image captured by the second vehicle 200 and display the second image on the first display unit. This will be described below in detail with reference to FIG. 4B-(2).

Referring to FIG. 4B, the vehicle 100 may display the second image captured by the second vehicle 200 and an image of the second vehicle 200 on a first display unit 120.

Upon determining the first vehicle as the second vehicle 200 as in FIG. 4A-(1), as exemplarily shown in FIG. 4B-(1), the vehicle 100 may display an image captured by the second vehicle 200 and a second vehicle image 201 on the first display unit 120. Here, the second vehicle image 201 may be a wireframe representing a frame of the second vehicle 200. In addition, the second vehicle image 201 may be a transparent image acquired by processing an image of the second vehicle 200 captured by the user vehicle 100.

Upon determining the vehicle immediately ahead of the first vehicle as the second vehicle 200 as in FIG. 4A-(2), as exemplarily shown in FIG. 4B-(2), the vehicle 100 may display an image captured by the second vehicle 200 and a composite image 202 of the first vehicle and the second vehicle on the first display unit 120. Here, the composite image 202 of the first vehicle and the second vehicle may be a composite image of a wireframe representing a frame of the first vehicle and a wireframe representing a frame of the second vehicle. In this case, a size of the wireframe representing the frame of the first vehicle may be less than a size of the wireframe representing the frame of the second vehicle. In addition, when at least one vehicle is located between the first vehicle and the second vehicle, the composite image 202 of the first vehicle and the second vehicle may be an image that further includes a wireframe of the at least one vehicle between the first vehicle and the second vehicle.

In addition, the composite image 202 of the first vehicle and the second vehicle may be a transparent image acquired by processing an image of the first vehicle captured by the user vehicle and an image of the second vehicle captured by the first vehicle.

Although the above description of FIGS. 4A and 4B are based on the embodiment in which the user vehicle 100 in the second state displays an image captured by the second vehicle 200, the above description of FIGS. 4A and 4B may be applied to the case in which the user vehicle 100 displays the image captured by the second vehicle 200 even when not in the second state.

Figure 5:
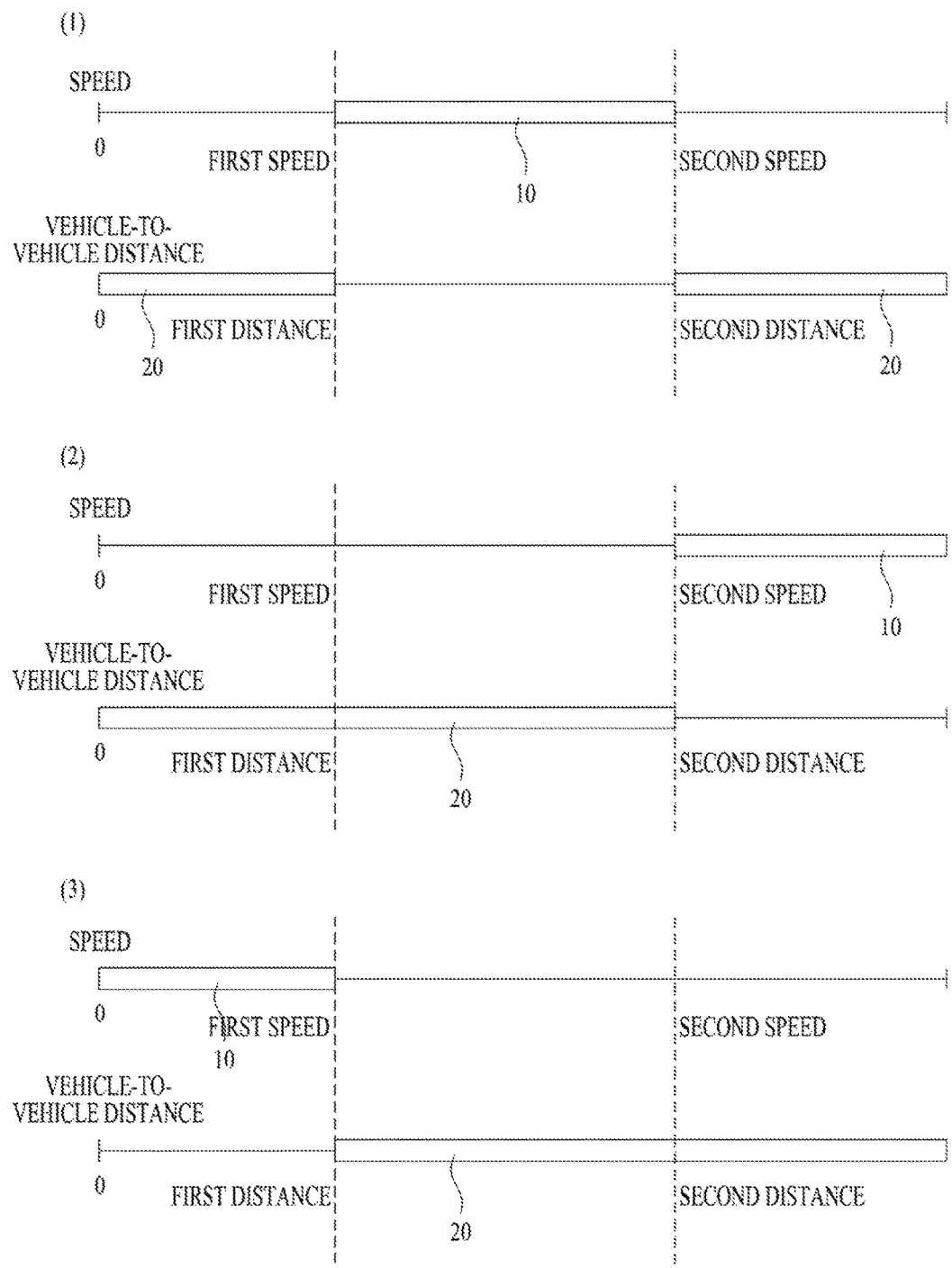
FIG. 5 shows the state of a vehicle according to another embodiment of the present specification.

FIG. 5 shows the state of a vehicle according to another embodiment of the present specification. More specifically, FIG. 5 shows an additional state of the vehicle except for the states of the vehicle as described above.

Referring to FIG. 5-(1), when the vehicle-to-vehicle distance 20 is equal to or greater than the second distance when the vehicle-to-vehicle distance 20 is less than the first distance in a state in which the speed 10 of the vehicle is equal to or greater than the first speed and less than the second speed, the vehicle may display at least one of a first image captured by the user vehicle and a second image captured by the second vehicle based on predetermined setting. For example, when the vehicle-to-vehicle distance 20 is equal to or greater than the second distance when the vehicle-to-vehicle distance 20 is less than the first distance differently from in the aforementioned first state of the vehicle in a state in which the speed 10 of the vehicle is equal to or greater than the first speed and less than the second speed, the vehicle may display a second image captured by the second vehicle rather than a first image captured by the user vehicle. In this case, the predetermined setting may be defined by user input or may be defined upon the manufacture of the vehicle.

Referring to FIG. 5-(2), when the vehicle-to-vehicle distance 20 is less than the second distance in a state in which the speed 10 of the vehicle is equal to or greater than the second speed, the vehicle may display at least one of a first image captured by the user vehicle and a second image captured by the second vehicle on the first display unit based on predetermined setting. For example, when the vehicle-to-vehicle distance 20 is less than the second distance differently from that in the aforementioned second state of the vehicle in a state in which the speed 10 of the vehicle is equal to or greater than the second speed, the vehicle may display a first image captured by the user vehicle rather than a second image captured by the second vehicle.

Referring to FIG. 5-(3), when the vehicle-to-vehicle distance 20 is equal to or greater than the first distance in a state in which the speed 10 of the vehicle is less than the first speed, the vehicle may display at least one of a first image captured by the user vehicle and a second image captured by the second vehicle on the first display unit based on predetermined setting. For example, when the vehicle-to-vehicle distance 20 is equal to or greater than the first distance differently from that in the aforementioned third state of the vehicle in a state in which the speed 10 of the vehicle is less than the first speed, the vehicle may display a first image captured by the user vehicle rather than a second image captured by the second vehicle.

Figure 6A:
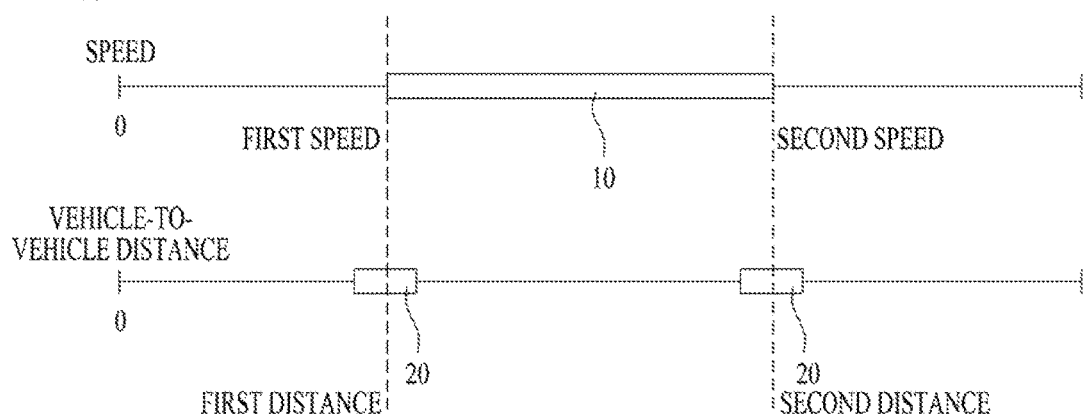
FIGS. 6A and 6B show a method of displaying an image by the vehicle based on an unexpected state of the vehicle according to one embodiment of the present specification.
Figure 6A:
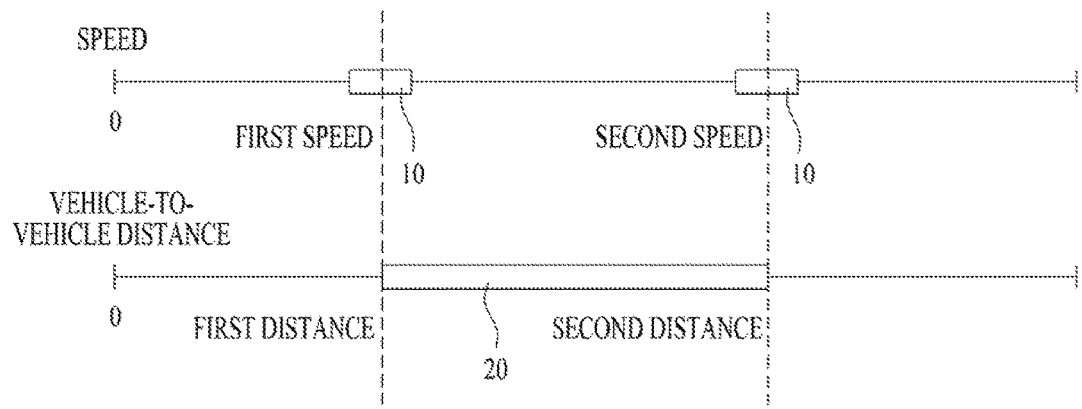
Figure 6B:
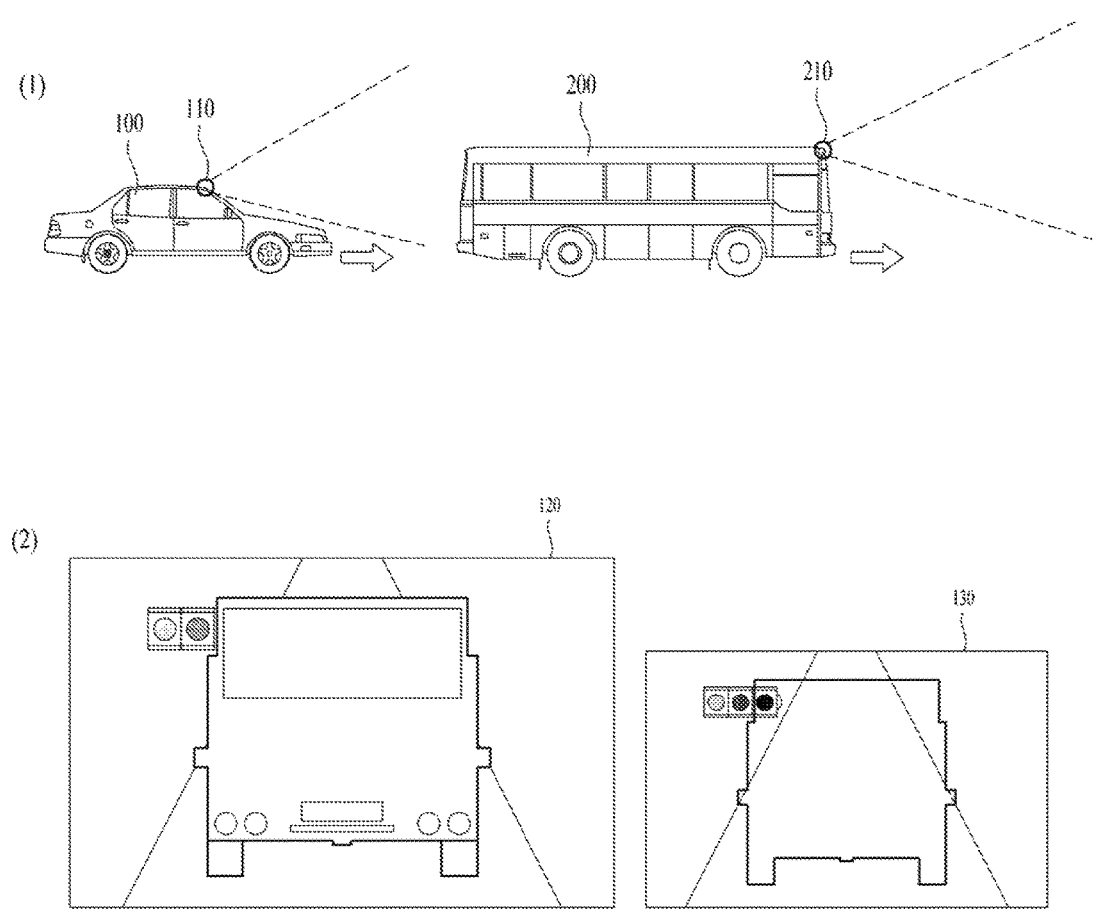

FIGS. 6A and 6B show a method of displaying an image by the vehicle based on an unexpected state of the vehicle according to one embodiment of the present specification. More specifically, FIG. 6A shows an unexpected state of the vehicle and FIG. 6B shows a method of displaying an image on the first display unit and the second display unit in the unexpected state of the vehicle. The vehicle in the following description may further include a second display unit.

Referring to FIG. 6A-(1), when the vehicle-to-vehicle distance 20 is kept for a predetermined time within a given range from the first distance or when the vehicle-to-vehicle distance 20 is kept for a predetermined time within a given range from the second distance in a state in which the speed 10 of the vehicle is equal to or greater than the first speed and less than the second speed, the vehicle may further activate the second display unit.

For example, when the vehicle-to-vehicle distance 20 is repeatedly increased and reduced on the basis of the first distance or repeatedly increased and reduced on the basis of the second distance for a predetermined time in a state in which the speed 10 of the vehicle is equal to or greater than the first speed and less than the second speed, the vehicle may further activate the second display unit. In this case, differently from that in the second state of the vehicle, the vehicle may display a first image captured by the user vehicle on the first display unit and display a second image captured by the second vehicle on the second display unit. This will be described below in detail with reference to FIG. 6B.

Referring to FIG. 6A-(2), when the speed 10 of the vehicle is kept for a predetermined time within a given range from the first speed or when the speed 10 of the vehicle is kept for a predetermined time within a given range from the second speed in a state in which the vehicle-to-vehicle distance 20 is equal to or greater than the first distance and less than the second distance, the vehicle may further activate the second display unit.

For example, when the speed 10 of the vehicle is repeatedly increased and reduced on the basis of the first speed or repeatedly increased and reduced on the basis of the second speed for a predetermined time in a state in which the vehicle-to-vehicle distance 20 is equal to or greater than the first distance and less than the second distance, the vehicle may further activate the second display unit. In this case, differently from that in the second state of the vehicle, the vehicle may display a first image captured by the user vehicle on the first display unit and display a second image captured by the second vehicle on the second display unit. This will be described below in detail with reference to FIG. 6B.

Referring to FIG. 6B-(1), the vehicle 100 may simultaneously acquire a first image captured by the first camera unit 110 of the user vehicle 100 and a second image captured by the second camera unit 210 of the second vehicle in the case of FIG. 6A-(1) and in the case of FIG. 6A-(2).

Referring to FIG. 6B-(2), the vehicle 100 may simultaneously activate the first display unit 120 and the second display unit 130 in the case of FIG. 6A-(1) and in the case of FIG. 6A-(2). In one embodiment, the first display unit 120 may be a main display unit and the second display unit 130 may be an auxiliary display unit.

In addition, the vehicle 100 may display a first image on the first display unit 120 and display a second image on the second display unit 130. That is, when the speed of the vehicle 100 is repeatedly changed from a basis speed or when the vehicle-to-vehicle distance is repeatedly changed from a basis distance, the vehicle 100 may further activate the second display unit to display a first image and a second image respectively on the first display unit and the second display unit, instead of repeatedly switching an image displayed on the first display unit, i.e. switching from a first image to a second image or vice versa. This may prevent user confusion due to repeated image switching.

Although FIG. 6B-(2) has described the first display unit and the second display unit as separate display units, the first display unit and the second display unit may be separate display areas on one display unit according to an embodiment. For example, the first display unit and the second display unit may respectively be a main display area and an auxiliary display area of a single display unit.

FIG. 7 is a flowchart of a control method of a vehicle according to one embodiment of the present specification. In the following description of the flowchart, a description related to parts overlapping the above description of FIGS. 1 to 6B will be omitted.

Referring to FIG. 7, the vehicle may sense a speed of the vehicle using a speed sensor unit (S710). Next, the vehicle may sense a vehicle-to-vehicle distance between the vehicle and a first vehicle immediately ahead of the vehicle using a distance sensor unit (S720). Here, the first vehicle may refer to a vehicle having the shortest distance from the user vehicle among vehicles ahead of the user vehicle. In this case, the first vehicle may be a vehicle in the same lane as the user vehicle, without being limited thereto. In addition, the first vehicle may be a vehicle traveling in the same direction as the user vehicle.

Next, the vehicle may determine a state of the vehicle based on the speed and the vehicle-to-vehicle distance thereof (S730). Next, the vehicle may judge whether the vehicle is in a first state, in a second state or in a third state (S740).

In this case, the first state may refer to a state in which the speed of the vehicle is equal to or greater than a first speed and less than a second speed and the vehicle-to-vehicle distance is equal to or greater than a first distance and less than a second distance. In addition, the second state may refer to a state in which the speed of the vehicle is equal to or greater than the second speed and the vehicle-to-vehicle distance is equal to or greater than the second distance. In addition, the third state may refer to a state in which the speed of the vehicle is less than the first speed and the vehicle-to-vehicle distance is less than the first distance. The respective states of the vehicle have been described above with reference to FIGS. 3A, 3B, and 3C, and thus a detailed description thereof will be omitted below.

Next, when the vehicle is in the first state, the vehicle may display a first image captured by a first camera unit on a first display unit (S750). Here, the first camera unit and the first display unit may respectively be a camera unit and a display unit installed to the user vehicle. Here, the first image may be an image group including plural images captured by the first camera unit.

Next, when the vehicle is in the second state, the vehicle may display a second image captured by a second camera unit on the first display unit (S760). Here, the second camera unit may be a camera unit installed in a second vehicle rather than the user vehicle. Here, the second image may be an image group including plural images captured by the second camera unit.

In this case, the second vehicle may be any one of one or more vehicles ahead of the user vehicle. In one example, the second vehicle and the first vehicle may be one and the same. In another example, the second vehicle may be a vehicle, a visual field of which is secured and a distance from the user vehicle of which has the shortest value, among one or more vehicles ahead of the first vehicle. In this case, the second vehicle may be a vehicle in the same lane as the user vehicle, without being limited thereto. In addition, the second vehicle may be a vehicle traveling in the same direction as the user vehicle and the first vehicle. A method of determining the second vehicle has been described above with reference to FIGS. 4A and 4B, and thus a detailed description thereof will be omitted below.

Next, when the vehicle is in the third state, the vehicle may display the second image and traffic information on the first display unit (S770). Here, traffic information may include at least one of traffic signal information, traffic situation information on a per road section basis and traffic accident information.

Although FIG. 7 has described the representative three states of the vehicle, the vehicle may have an additional state or an unexpected state except for the above three states. This has been described above with reference to FIGS. 5, 6A, and 6B, and thus a detailed description thereof will be omitted below.

As is apparent from the above description, according to the present specification, a vehicle may display one of an image captured by the vehicle itself and an image captured by another vehicle based on a state of the vehicle, thereby providing user-friendly image information.

In addition, according to the present specification, the vehicle may prevent display of an unnecessary image by determining the state of the vehicle based on a speed of the vehicle and a vehicle-to-vehicle distance between the vehicle and the other vehicle.

Although the preferred embodiments have been illustrated and described, those skilled in the art will appreciate that the present specification should not be limited to the above specific embodiments and various modifications thereof are possible without departing from the scope and spirit of the present specification as disclosed in the accompanying claims and these modifications should not be understood independently of the technical idea of the present specification.

The vehicle and the control method thereof according to the present specification may be implemented as code that may be written on a processor readable recording medium and thus read by a processor provided in a network device. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

In the present specification, an angle, a distance and a direction may be understood as not only referring to accurate values, but as also including a substantial speed and a substantial direction within a given range. That is, a speed and a direction of the present specification may refer to a substantial speed and a substantial direction, and a given tolerance may be present therebetween.

In addition, both the invention of a device and the invention of a method have been described in this specification, and thus descriptions of both the inventions may be complementally applied as necessary.

What is claimed is:

1. An electronic device configured to be installed in a vehicle, the electronic device comprising:
   a user interface;
   a display configured to display an image according to a user input via the user interface; and
   a processor connected with a communication unit and the display;
   wherein the processor is configured to:
   receive a first image that is captured by a first camera installed in a preceding vehicle via the communication unit, from the preceding vehicle,
   receive a second image that is captured by a second camera installed in the vehicle from the vehicle,
   control the display to display a composite image including at least a portion of the first image and at least a portion of the second image, wherein the composite image further includes an align-image aligning at least one parameter of the first image with at least one parameter of the second image based on a same parameter of each image and a wireframe image of the preceding vehicle extracted from the second image,
   control the display to display the align-image aligning the at least one parameter of the first image with the at least one parameter of the second image based on a front field of view image of the vehicle with a guide line, or
   control the display to display the align-image aligning the at least one parameter of the first image with the at least one parameter of the second image based on the same parameter of each image in real time with the guide line,
   wherein the electronic device further comprises:
   a speed sensor unit; and
   a distance sensor unit,
   wherein the processor is further configured to:
   sense a speed of the vehicle using the speed sensor unit,
   sense a vehicle-to-vehicle distance between the vehicle and a first vehicle immediately ahead of the vehicle using the distance sensor unit, and
   determine a state of the vehicle based on the speed and the vehicle-to-vehicle distance thereof,
   wherein the state of the vehicle includes:
   a first state in which the speed of the vehicle is equal to or greater than a first speed and less than a second speed and the vehicle-to-vehicle distance is equal to or greater than a first distance and less than a second distance,
   a second state in which the speed of the vehicle is equal to or greater than the second speed and the vehicle-to-vehicle distance is equal to or greater than the second distance, or
   a third state in which the speed of the vehicle is less than the first speed and the vehicle-to-vehicle distance is less than the first distance, and
   wherein the processor is further configured to:
   when the vehicle is in the first state, control the display to display the first image,
   when the vehicle is in the second state, control the display to display the second image, and
   when the vehicle is in the third state, control the display to display the second image with traffic information.

2. The electronic device according to claim 1, wherein the processor is further configured to receive an area image that is securing a front field of view via the communication unit from the preceding vehicle, and
   wherein the first image includes the area image.

3. The electronic device according to claim 2, wherein the processor is further configured to receive the area image that is securing the front field of view, via the communication unit from the preceding vehicle, when the distance between the vehicle and the preceding vehicle is shorter than a prescribed distance.

4. The electronic device according to claim 1, wherein the vehicle and the preceding vehicle travel in the same direction, and
   wherein when the velocity of the vehicle is less than a prescribed velocity and the distance between the vehicle and the preceding vehicle is less than a prescribed distance, the processor is further configured to display the composite image.

5. An electronic device configured to be installed in a vehicle, the electronic device comprising:
   a user interface; and
   a processor connected with a communication unit,
   wherein the processor is configured to:
   receive a first image that is captured by a first camera installed in a preceding vehicle via the communication unit from the preceding vehicle,
   receive a second image that is captured by a second camera installed in the vehicle from the vehicle,
   generate a composite image including at least a portion of the first image and at least a portion of the second image,
   wherein the electronic device further comprises a display configured to display a composite image according to a user input via the user interface, wherein the composite image further includes an align-image aligning at least one parameter of the first image with at least one parameter of the second image based on a same parameter of each image and a wireframe image of the preceding vehicle extracted from the second image,
   control the display to display the align-image aligning the at least one parameter of the first image with the at least one parameter of the second image based on a front field of view image of the vehicle with a guide line, or
   control the display to display the align-image aligning the at least one parameter of the first image with the at least one parameter of the second image based on the same parameter of each image in real time with the guide line,
   wherein the electronic device further comprises:
   a speed sensor unit; and
   a distance sensor unit,
   wherein the processor is further configured to:
   sense a speed of the vehicle using the speed sensor unit,
   sense a vehicle-to-vehicle distance between the vehicle and a first vehicle immediately ahead of the vehicle using the distance sensor unit, and
   determine a state of the vehicle based on the speed and the vehicle-to-vehicle distance thereof,
   wherein the state of the vehicle includes:
   a first state in which the speed of the vehicle is equal to or greater than a first speed and less than a second speed and the vehicle-to-vehicle distance is equal to or greater than a first distance and less than a second distance,
   a second state in which the speed of the vehicle is equal to or greater than the second speed and the vehicle-to-vehicle distance is equal to or greater than the second distance, or
   a third state in which the speed of the vehicle is less than the first speed and the vehicle-to-vehicle distance is less than the first distance, and wherein the processor is further configured to:
when the vehicle is in the first state, control the display to display the first image,
when the vehicle is in the second state, control the display to display the second image, and
when the vehicle is in the third state, control the display to display the second image with traffic information.

6. A control method of an electronic device configured to be installed in a vehicle, the control method comprising:
receiving a first image that is captured by a first camera installed in a preceding vehicle via a communication unit, from the preceding vehicle;
receiving a second image that is captured by a second camera installed in the vehicle from the vehicle; and
controlling a display to display a composite image including at least a portion of the first image and at least a portion of the second image, wherein the composite image further includes an align-image aligning at least one parameter of the first image with at least one parameter of the second image based on a same parameter of each image and a wireframe image of the preceding vehicle extracted from the second image;
controlling the display to display the align-image aligning the at least one parameter of the first image with the at least one parameter of the second image based on a front field of view image of the vehicle, or
controlling the display to display the align-image aligning the at least one parameter of the first image with the at least one parameter of the second image based on the same parameter of each image in real time;
sensing a speed of the vehicle using a speed sensor unit;
sensing a vehicle-to-vehicle distance between the vehicle and a first vehicle immediately ahead of the vehicle using a distance sensor unit; and
determining a state of the vehicle based on the speed and the vehicle-to-vehicle distance thereof,
wherein the state of the vehicle includes:
a first state in which the speed of the vehicle is equal to or greater than a first speed and less than a second speed and the vehicle-to-vehicle distance is equal to or greater than a first distance and less than a second distance,
a second state in which the speed of the vehicle is equal to or greater than the second speed and the vehicle-to-vehicle distance is equal to or greater than the second distance, or
a third state in which the speed of the vehicle is less than the first speed and the vehicle-to-vehicle distance is less than the first distance, and
wherein the method further comprises:
when the vehicle is in the first state, controlling the display to display the first image;
when the vehicle is in the second state, controlling the display to display the second image; and
when the vehicle is in the third state, controlling the display to display the second image with traffic information.

7. The control method according to claim 6, further comprising:
receiving an area image that is securing a front field of view via the communication unit from the preceding vehicle, and
wherein the first image includes the area image.

8. The control method according to claim 7, further comprising:
receiving the area image that is securing the front field of view, via the communication unit, from the preceding vehicle when the distance between the vehicle and the preceding vehicle is shorter than a prescribed distance.

9. The control method according to claim 6, further comprising:
controlling the display to display the composite image, when the velocity of the vehicle is less than a prescribed velocity and the distance between the vehicle and the preceding vehicle is less than a prescribed distance,
wherein the vehicle and the preceding vehicle travel in the same direction.

10. A control method of an electronic device configured to be installed in a vehicle, the control method comprising:
receiving a first image that is captured by a first camera installed in a preceding vehicle via a communication unit from a preceding vehicle;
receiving a second image that is captured by a second camera installed in the vehicle from the vehicle;
generating a composite image including at least a portion of the first image and at least a portion of the second image, wherein the composite image further includes an align-image aligning at least one parameter of the first image with at least one parameter of the second image based on a same parameter of each image and a wireframe image of the preceding vehicle extracted from the second image;
controlling a display to display the composite image according to a user input via the user interface;
controlling the display to display the align-image aligning the at least one parameter of the first image with the at least one parameter of the second image based on a front field of view image of the vehicle, or
controlling the display to display the align-image aligning the at least one parameter of the first image with the at least one parameter of the second image based on the same parameter of each image in real time;
sensing a speed of the vehicle using a speed sensor unit;
sensing a vehicle-to-vehicle distance between the vehicle and a first vehicle immediately ahead of the vehicle using a distance sensor unit; and
determining a state of the vehicle based on the speed and the vehicle-to-vehicle distance thereof,
wherein the state of the vehicle includes:
a first state in which the speed of the vehicle is equal to or greater than a first speed and less than a second speed and the vehicle-to-vehicle distance is equal to or greater than a first distance and less than a second distance,
a second state in which the speed of the vehicle is equal to or greater than the second speed and the vehicle-to-vehicle distance is equal to or greater than the second distance, or
a third state in which the speed of the vehicle is less than the first speed and the vehicle-to-vehicle distance is less than the first distance, and
wherein the method further comprises:
when the vehicle is in the first state, controlling the display to display the first image;
when the vehicle is in the second state, controlling the display to display the second image; and
when the vehicle is in the third state, controlling the display to display the second image with traffic information.

* * * * *